United States Patent [19]

Wier

[11] 4,247,405

[45] Jan. 27, 1981

[54] VISCOSITY-STABILIZED AQUEOUS SOLUTIONS

[75] Inventor: Donald R. Wier, Bartlesville, Okla.

[73] Assignee: Phillips Petroleum Company, Bartlesville, Okla.

[21] Appl. No.: 920,884

[22] Filed: Jun. 30, 1978

Related U.S. Application Data

[62] Division of Ser. No. 740,273, Nov. 9, 1976, Pat. No. 4,124,073.

[51] Int. Cl.³ .............. E21B 43/22; E21B 43/24; E21B 43/26
[52] U.S. Cl. ........................ 252/8.55 D; 166/272; 252/8.5 C; 252/8.55 R; 260/45.9 P
[58] Field of Search ............ 166/272, 273, 274, 275, 166/288; 252/8.55 D, 8.55 R, 8.5 C, 402; 260/45.9 P

[56] References Cited

U.S. PATENT DOCUMENTS

| | | | |
|---|---|---|---|
| 3,116,791 | 1/1964 | Sandiford et al. | 166/274 |
| 3,201,367 | 8/1965 | Smith | 260/45.9 P |
| 3,235,523 | 2/1966 | Schurz et al. | 260/29.6 Z |
| 3,370,035 | 2/1968 | Ogura et al. | 260/45.9 P X |
| 3,373,808 | 3/1968 | Patton | 166/275 |
| 3,412,793 | 11/1968 | Needham | 166/272 X |
| 3,663,477 | 5/1972 | Ahearn | 166/275 X |
| 3,739,848 | 6/1973 | Lawson et al. | 166/274 |

*Primary Examiner*—Herbert B. Guynn

[57] ABSTRACT

Thiourea functions as a solution viscosity stabilizer in aqueous compositions comprising thiourea, nonionic polymers such as polyalkylene oxides and anionic surfactants such as petroleum sulfonates. The aqueous compositions are useful in connection with fluid-drive oil recovery processes, processes for drilling, completing, or working over wells, or the like processes in which a thickened fluid is injected into or brought into contact with a subterranean earth formation.

7 Claims, No Drawings

VISCOSITY-STABILIZED AQUEOUS SOLUTIONS

This application is a division of my copending application having Ser. No. 740,273, filed Nov. 9, 1976 issued Nov. 7, 1978, as U.S. Pat. No. 4,124,073.

This invention relates to aqueous solutions exhibiting a relatively stable solution viscosity. In accordance with another aspect, this invention relates to the use of thiourea as an antioxidant and viscosity stabilizer for aqueous solutions containing anionic surfactants and polymers. In accordance with another aspect, this invention relates to a method of stabilizing aqueous solutions containing anionic surfactants and nonionic polymers by incorporation of thiourea. In accordance with a further aspect, this invention relates to the use of aqueous solutions exhibiting a relatively stable solution viscosity at ambient temperature and after heating at 70° C. which solutions contain thiourea, anionic surfactants, and nonionic polymers in the recovery of oil from subterranean oil-bearing formations.

It has been observed that aqueous solutions containing nonionic polymers exhibit a loss in solution viscosity and are less stable at elevated temperature, and it has been found that various solution viscosity stabilizers exhibit varying degrees of effectiveness. It has been further observed that in aqueous solutions containing nonionic polymers and anionic surfactants the loss of solution viscosity is a more serious problem, particularly after heating the aqueous solution to temperatures of at least 70° C. The present invention is directed to the addition of a viscosity stabilizer for aqueous solutions containing nonionic polymers and anionic surfactants in order to minimize the loss of solution viscosity at ambient temperature and after heating at 70° C.

Accordingly, an object of this invention is to provide viscosity-stabilized aqueous solutions.

A further object of this invention is to provide a viscosity stabilizer for aqueous solutions exhibiting a tendency to lose solution viscosity, particularly on heating at elevated temperature.

A further object of this invention is to provide a viscosity-stabilized aqueous solution for utilization in oil recovery processes.

Other objects, aspects, and the several advantages of this invention will become apparent upon a study of this disclosure and the appended claims.

In accordance with the present invention, thiourea functions as a solution viscosity stabilizer in novel aqueous compositions comprising thiourea, nonionic linear or branched polyalkylene oxides such as polyethylene oxide and anionic surfactants such as petroleum sulfonates.

The compositions of the invention are useful in connection with fluid-drive oil recovery processes, processes for drilling, completing, or working over wells, or the like processes in which a thickened fluid is injected into or brought into contact with a subterranean earth formation, e.g., as mobility buffers, fracturing fluids, etc., for use in post-primary oil recovery. It is to be noted that the inventive compositions can be prepared in fresh water or brine.

In accordance with one embodiment, a gaseous medium such as steam or $CO_2$ is injected into said formation and in contact with said aqueous solution under conditions which produce a foam which selectively blocks the more depleted portions of the formation and forces the remaining gaseous medium to produce oil from less depleted portions of the formation.

In accordance with another embodiment, a process is provided for improving the production of oil from an oil-bearing formation by the pressure of steam therein which is channeling undesirably from a steam injection well into a production well owing to channeling in said formation which comprises injecting into said channels of said formation an aqueous fluid exhibiting a relatively stable solution viscosity at ambient temperature and after heating at 70° C. comprising thiourea, nonionic polymers and anionic surfactants as defined herein injecting steam downwardly through the injection well and outwardly through the formation into contact with said aqueous solution in said channels to form a relatively stable foam having steam as a gas phase in said channels to thereby plug same and thus producing a selective blocking which forces the remaining steam to produce oil from less depleted portions of the formation; and continuing to inject steam through the formation to produce oil from the less depleted portions of the formation.

In accordance with another embodiment, a process is provided for decreasing the permeability of a subterranean oil-bearing formation penetrated by at least one injection well and at least one producing well spaced from said injection well and producing oil from the formation which comprises injecting steam through an injection well and/or production well into a formation together with an aqueous solution comprising thiourea, nonionic polymers and anionic surfactants as defined herein; injecting steam downwardly through an injection well and outwardly through the formation into contact with the aqueous solution to heat the solution and activate the surfactant and production of foam having condensible gas as its gaseous phase which selectively blocks the more depleted portions of the formation and forces the remaining steam to produce oil from the less depleted portions of the formation; and continuing to inject steam through the formation to produce oil from the less depleted portions of the formation.

In preparing the novel compositions of the present invention, the thiourea viscosity stabilizer component is incorporated into aqueous mixtures of the nonionic polymeric component and the anionic surfactant component in any convenient manner. Although the mixing procedure is not critical, the preparation of the inventive aqueous compositions is advantageously carried out by adding an aqueous solution of the surfactant component to an aqueous solution of thiourea and the nonionic polymeric component. In the latter solution if the nonionic polymeric component is dissolved first, efficient mixing is required to insure complete and uniform mixing of the thiourea into the mixture. Alternatively, the thiourea viscosity stabilizer component and nonionic polymeric component can be blended in the desired proportions prior to solution preparation. It is also contemplated that an aqueous nonionic polymer solution can be added to an aqueous solution of surfactant and thiourea. The inventive compositions can be obtained as solids by the controlled evaporation of the inventive aqueous solutions to dryness.

The nonionic polymeric components suitable for use in the present inventive compositions comprise high molecular weight polyalkylene oxide compounds such as polyethylene oxide and polypropylene oxide as well as the polyoxyethylated and polyoxypropylated derivatives of hydrolylated compounds such as phenols and alcohols. Particularly preferred are the ethylene oxide polymers such as those sold by Union Carbide under the trademark Polyox. The specific polymer which is preferred is Polyox WSR-301 having an approximate average molecular weight of about 4,000,000. In general, such polymers can be used which possess average molecular weights in the range of 100,000 to 10,000,000.

The alkylene oxide polymer is generally employed in a minimum concentration range of about 0.001 weight percent based on the total weight of the composition and concentrations up to about 2 weight percent are suitable. Preferably the polymer concentration is in the range of 0.1 to 1.5 weight percent. The concentration of the polymer should not be so great that the polymer is precipitated on addition of the surfactant component.

The surfactant component in the inventive compositions is preferably anionic but can comprise surface-active agents possessing ionic character due to the presence of various polar groups which may be of an anionic and/or cationic nature. Generally, suitable surfactants have hydrocarbon chain portions containing on the order of about 16 carbon atoms. A readily available and preferred anionic surfactant component for use in the present composition is the so-called "petroleum sulfonates" which can be prepared by the $SO_3$ sulfonation of a relatively narrow boiling range mixture of petroleum hydrocarbons. Additional anionic surfactants suitable for use in the present invention are described by the formulas (A), (B), and (C)

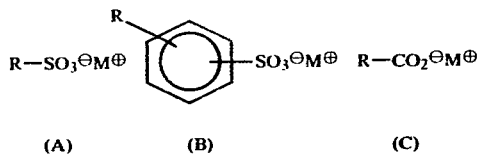

wherein R is an alkyl radical having from 8 to 25 and preferably 10 to 16 carbon atoms and M⊕ represents a monovalent cation such as ammonium, sodium, or potassium. Suitable sulfated anionic surfactants are described by formulas (D) and (E)

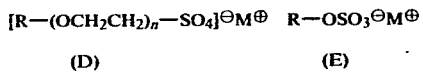

wherein n is an integer from 1 to 10, and R and M⊕ have the same meaning as above with the proviso that in (D) R can be alkaryl containing 10 to 14 carbon atoms. Representative cationic surfactants which are useful in the present invention are described by the formula (F)

wherein R has the same meaning as above, R" represents alkyl radicals containing 1 to 4 carbon atoms which may be the same or different and X⊖ represents an anionic grouping such as chloride, bromide, iodide, fluoride, or methylsulfate.

The following listing discloses a representative but not limiting number of surfactant components which are suitable for use in the present invention: sodium tridecylbenzenesulfonate, petroleum sulfonates, sodium lauryl sulfate, sodium stearate, ammonium hexadecanesulfonate, and sulfated derivatives of commercially available ethoxylated straight chain primary or secondary alcohols and sulfated derivatives of commercially available ethoxylated alkylphenols. The compound hexadecyltrimethylammonium chloride is an example of a cationic surfactant which is suitable for use in the present invention.

The concentration of the surfactant component is in the range of 0.5 to 10 weight percent based on the total weight of the composition but preferably in the range of 2 to 8 percent. It is to be noted that the use of polymer concentrations and surfactant concentrations near the upper end of the suitable ranges can lead to polymer precipitation on mixing.

The concentration of the thiourea component in the inventive compositions can be in the range of 0.1 to 9 weight percent based on the total weight of the composition but preferably in the range of 3 to 6 weight percent. The amount of thiourea added is sufficient to maintain a relatively stable solution viscosity of the aqueous solution at ambient temperature and after heating at 70° C. It has been found that with the addition of thiourea to aqueous solutions containing anionic surfactants and nonionic polymers the loss of solution viscosity if less than 20 percent which cannot be accomplished by other additives, as shown by the specific working examples hereinbelow.

The following examples are illustrative of the invention.

EXPERIMENTAL

A stock solution of the surfactant component was prepared, e.g., by mixing 161 g of commercially available petroleum sulfonate (TRS 10-410 from Witco Chemical Co., 62% active sulfonate) with 839 g distilled water to give 1,000 g of solution. It was found convenient to use 30 g aliquots of this stock solution for the addition of surfactant equivalent to 3 g "active sulfonate" in accordance with the following calculation:

$$30 \text{ g stock solution} \times \frac{16.1 \text{ g TRS 10-410}}{100 \text{ g stock solution}} \times \frac{62 \text{ g "active sulfonate"}}{100 \text{ g TRS 10-410}}$$

thus, 0.30×16.1×0.62=3g "active sulfonate."

A stock solution of the nonionic polymeric component was prepared by mixing 10 g of commercially available polyethylene oxide (POLYOX WSR-301, Union Carbide) with 990 g distilled water containing 0.75 ml of 37 weight percent aqueous formaldehyde to give approximately 1,000 g of solution. It was found convenient to use 40 g aliquots of this stock solution for the addition of nonionic polymer equivalent to 0.2 g nonionic polymer in accordance with the following calculation:

$$20 \text{ g stock solution} \times \frac{1.0 \text{ g Polyox WSR-301}}{100 \text{ g stock solution}}$$

thus, 20×0.01=0.2 g Polyox WSR-301.

EXAMPLE I

Two-Component Systems:

Polymer + Viscosity Stabilizers

Aqueous solutions of polyethylene oxide and various viscosity stabilizing components were prepared and solution viscosities were determined to reflect the stabilities of these systems at ambient temperature and after heating to 70° C. in the absence of any surfactant component. In general, 20 g aliquots of one weight percent polyethylene oxide stock solution (equivalent to 0.2 g or 2,000 ppm polyethylene oxide) were mixed with 0.5 g (5,000 ppm) stabilizing component and sufficient water to give 100 g of test solutions for viscosity measurements. The results of several representative runs are shown below in Tables I and II.

TABLE I

VISCOSITY DATA ON AQUEOUS SOLUTIONS CONTAINING VISCOSITY STABILIZER (5,000 ppm) AND POLYETHYLENE OXIDE (2,000 ppm)# AT AMBIENT TEMPERATURE

| Run No. | Viscosity Stabilizer (5,000 ppm) | Initial ($V_i$) | After 15 Hrs. at Ambient Temperature | Percentage Decrease in Viscosity after 15 hours at Ambient Temperature $(V_i - V_a/V_i) \times 100$ |
|---|---|---|---|---|
| Control | None | 17.7 | 17.3 | 2.3 |
| 1 | $CH_3CH_2OH$ | 16.0 | 17.0 | (5.9)* |
| 2 | $HOCH_2CH_2OH$ | 16.3 | 17.1 | (4.9)** |
| 3 | $(H_2N)_2C=S$ | 16.4 | 17.0 | (3.7)*** |
| 4 | $CH_3OH$ | 17.3 | 17.0 | 1.7 |
| 5 | $[(CH_3)_2CHO]_3P$ | 15.3 | 14.9 | 2.6 |
| 6 | $(CH_3)_2CHOH$ | 17.7 | 17.1 | 3.4 |
| 7 | $Na_2S_2O_3$ | 17.2 | 16.5 | 4.1 |
| 8 | $Na_3PO_3$ | 16.5 | 17.4 | 5.5 |
| 9 | $CH_2=CHCH_2OH$ | 18.2 | 15.3 | 15.9 |
| 10 | $NaNO_2$ | 14.6 | 7.5 | 48.6 |

These solutions contained no surfactant.
*Solution viscosity increased by 5.9 percent.
**Solution viscosity increased by 4.9 percent.
***Solution viscosity increased by 3.7 percent.

The results in Table I indicate that aqueous solutions of polyethylene oxide and various viscosity stabilizers in the absence of surfactant are relatively stable at room temperature except for Run 10 which contained $NaNO_2$. Apparently, the $NaNO_2$ additive promoted the oxidative degradation of the polyethylene oxide as evidenced by an approximately 50 percent decrease in solution viscosity.

The results in Table II indicate that aqueous solutions of polyethylene oxide not containing surfactant are less stable at elevated temperature, and various solution viscosity stabilizers exhibited varying degrees of effectiveness. The methanol additive in Run 1 was the best solution viscosity stabilizer followed in order by ethanol (Run 2), thiourea (Run 3), and sodium phosphite (Run 4). The remaining additives of Table II (Runs 5, 6, 7, 8, 9, and 10) were significantly less effective as solution viscosity stabilizers. The control run with no stabilizer suffered an 83 percent decrease in solution viscosity after the heat treatment.

TABLE II

VISCOSITY DATA ON AQUEOUS SOLUTIONS CONTAINING VISCOSITY STABILIZERS (4,000 ppm) AND POLYETHYLENE OXIDE (2,000 ppm) AFTER HEAT TREATMENT

| Run No. | Viscosity Stabilizer (5,000 ppm) | Solution Viscosity (cp) Initial ($V_i$) | at Ambient Temp. after Heating 15 hrs. at 70° C. | Percentage Decrease in Viscosity after Heat Treatment $(V_i - V_f/V_i) \times 100$ |
|---|---|---|---|---|
| Control | None | 17.7 | 3.0 | 83.0 |
| 1 | $CH_3OH$ | 17.3 | 16.0 | 7.5 |
| 2 | $CH_3CH_2OH$ | 16.0 | 13.8 | 13.7 |
| 3 | $(H_2N)_2=S$ | 16.4 | 13.6 | 17.1 |
| 4 | $Na_3PO_3$ | 16.5 | 13.5 | 18.2 |
| 5 | $(CH_3)_2CHOH$ | 17.7 | 12.2 | 31.0 |
| 6 | $NaNO_2$ | 14.6 | 9.6 | 34.3 |
| 7 | $CH_2=CH-CH_2OH$ | 18.2 | 11.6 | 36.3 |
| 8 | $HOCH_2CH_2OH$ | 16.3 | 9.8 | 39.9 |
| 9 | $Na_2S_2O_3$ | 17.2 | 8.4 | 51.1 |
| 10 | $[(CH_3)_2CHO]_3P$ | 15.3 | 3.0 | 80.3 |

EXAMPLE II

Three-Component Systems:

Polymer + Surfactant + Viscosity Stabilizer

Aqueous solutions of polyethylene oxide, petroleum sulfonate, and various viscosity stabilizing components were prepared and solution viscosities were determined to reflect the stabilities of the systems in the presence of the surfactant component at ambient temperature and after heating to 70° C. In general, 20 g aliquots of the polymer stock solution (equivalent to 0.2 g or 2,000 ppm polyethylene oxide) were combined with 30 g aliquots of the surfactant stock solution (equivalent to 3 g or 30,000 ppm active sulfonate) containing specified ppm levels of viscosity stabilizers and sufficient water to give 100 g of test solutions for viscosity measurements. The results of several representative runs are shown below in Tables II and IV.

The results in Table III dramatically indicate that the loss of solution viscosity is a more serious problem in the presence of surfactant. For example, in Table I (polymer + stabilizer systems) the percentage loss in solution viscosity at ambient temperature exceeded 16 percent in only one run (Run 10) whereas in Table III (polymer + stabilizer + surfactant) the percentage loss in solution viscosity at ambient temperature exceeded 16 percent in every run except Runs 1, 2, and 3. Runs 4–16 in Table II demonstrate that the solution viscosity was decreased more than 20 percent after 15 hours at ambient temperature.

The loss of solution viscosity is accentuated in such three-component systems on heating to 70° C. for 15 hours as shown by the data in Table IV. In Table IV the decrease in solution viscosity is less than 20 percent in only Runs 1 and 2 which represent inventive compositions containing thiourea as the solution viscosity stabilizer. Thus, the thiourea additive appears to be very effective in maintaining solution viscosity particularly in systems heated to 70° C. for periods up to and including 15 hours. Runs 3–16 in Table IV demonstrate that the solution viscosity was decreased more than 50 percent after the heat treatment in the presence of the other additives used.

TABLE III

VISCOSITY DATA ON AQUEOUS SOLUTIONS CONTAINING VISCOSITY STABILIZERS, POLYETHYLENE OXIDE, AND SURFACTANT AT AMBIENT TEMPERATURE#

| Run No. | Viscosity Stabilizer (ppm) | Initial ($V_i$) | After 15 Hrs. at Ambient Temp. | Percentage Decrease in Viscosity after 15 Hrs. at Ambient Temp. $(V_i - V_a/V_i) \times 100$ |
|---|---|---|---|---|
| Control | None | 62.8 | 34.8 | 44.5 |
| 1 | $(C_6H_5O)_3P$ (3,000) | 57.2 | 53.9 | 5.8 |
| 2 | $(H_2N)_2C=S$ (50,000) | 63.0 | 54.9 | 12.8 |
| 3 | $Na_3PO_3$ (5,000) | 39.5 | 33.2 | 16.0 |
| 4 | $[(CH_3)_2CHO]_3P$ (5,000) | 43.1 | 33.5 | 22.4 |
| 5 | $(C_8H_{17}O)_2POH$ (3,000) | 61.1 | 42.7 | 30.5 |
| 6 | $(H_2N)_2C=S$ (10,000) | 60.2 | 41.2 | 31.5 |
| 7 | $(CH_3CH_2O)_3P$ (5,000) | 14.4 | 9.3 | 35.4 |
| 8 | $CH_3OH$ (100,000) | 41.8 | 27.0 | 35.4 |
| 9 | $(CH_3)_2CHOH$ (5,000) | 62.0 | 39.0 | 35.5 |
| 10 | $CH_3CH_2OH$ (5,000) | 61.1 | 34.0 | 44.3 |
| 11 | $NaNO_2$ (15,000) | 31.5 | 17.0 | 46.0 |
| 12 | $CH_3OH$ (5,000) | 60.6 | 30.7 | 49.3 |
| 13 | Plastanox 2246[a] (3,000) | 52.6 | 26.4 | 49.8 |
| 14 | $Na_2S_2O_3$ (5,000) | 35.4 | 13.2 | 62.5 |
| 15 | $CH_3OH$ (50,000) | 52.0 | 14.8 | 71.5 |
| 16 | $(CH_3O)_3P$ (5,000) | 30.1 | 8.3 | 72.5 |

Solutions contained 2,000 ppm polyethylene oxide, 30,000 ppm petroleum sulfonate, and the indicated ppm of viscosity stabilizer
[a]2,2'-methylene bis(4-methyl-6-tert-butylphenol)

TABLE IV

VISCOSITY DATA ON AQUEOUS SOLUTIONS CONTAINING VISCOSITY STABILIZERS, POLYETHYLENE OXIDE, AND SURFACTANT AFTER HEAT TREATMENT#

| Run No. | Viscosity Stabilizer (ppm) | Solution Viscosity (cp) | | Percentage Decrease in Viscosity after Heat Treatment $(V_i - V_f/V_i) \times 100$ |
|---|---|---|---|---|
| | | Initial ($V_i$) | at Ambient Temp. after Heating for 15 hours at 70° C. | |
| Control | None | 62.8 | 4.5 | 93.0 |
| 1 | $(H_2N)_2C=S$ (50,000) | 63.0 | 62.1 | 1.4 |
| 2 | $(H_2N)_2C=S$ (10,000) | 60.2 | 48.5 | 19.4 |
| 3 | $Na_2S_2O_3$ (5,000) | 35.4 | 15.9 | 55.1 |
| 4 | $(CH_3CH_2O)_3P$ (5,000) | 14.4 | 4.0 | 72.1 |
| 5 | $(C_6H_5O)_3P$ (3,000) | 57.2 | 11.4 | 80.0 |
| 6 | $CH_3OH$ (100,000) | 41.8 | 6.1 | 85.5 |
| 7 | $NaNO_2$ (15,000) | 31.5 | 4.6 | 85.5 |
| 8 | $(CH_3O)_3P$ (5,000) | 30.1 | 3.9 | 87.0 |
| 9 | Plastanox 2246[a] (3,000) | 52.6 | 4.6 | 87.5 |
| 10 | $[(CH_3)_2CHO]_3P$ (5,000) | 43.1 | 5.0 | 88.5 |
| 11 | $CH_3OH$ (50,000) | 52.0 | 5.0 | 90.5 |
| 12 | $Na_3PO_3$ (5,000) | 39.5 | 3.6 | 90.8 |
| 13 | $(CH_3)_2CHOH$ (5,000) | 62.0 | 5.1 | 91.7 |
| 14 | $CH_3CH_2OH$ (5,000) | 61.1 | 4.9 | 92.0 |
| 15 | $CH_3OH$ (5,000) | 60.6 | 4.5 | 92.5 |
| 16 | $(C_8H_{17}O)_2POH$ (3,000) | 61.1 | 4.0 | 93.5 |

Solutions contained 2,000 ppm polyethylene oxide, 30,000 ppm petroleum sulfonate, and the indicated ppm of viscosity stabilizer.
[a]2,2'-methylene bis(4-methyl-6-tert-butylphenol).

The following laboratory core test results demonstrate the feasibility of using the inventive compositions in post-primary oil recovery operations.

EXAMPLE III

An 87.1 cm long Berea core with a water flood residual oil saturation of 37.7 percent of the pore volume was flooded with approximately 0.5 PV of an aqueous preflush solution which contained 1.25 percent ammonium sulfate and 1.0 percent thiourea. The core was then flooded with 0.56 PV of a surfactant solution which contained 3.0 weight percent active petroleum sulfonate (Petronate TRS LB, commercially available from Witco Chemical Co.), 0.3 weight percent polyethylene oxide (Polyox WSR-301, mol. wt. 4,000,000, commercially available from Union Carbide Co.), 1.0 weight percent thiourea, 5.0 weight percent crude oil, and 1.2 weight percent ammonium sulfate. One hundred percent of the water flood residual oil was displaced at 120° F. from the Berea core at 1.2 pore volumes after the start of the surfactant injection. T

EXAMPLE IV

In order to demonstrate the thermal stability of an inventive composition containing 2000 ppm polyethylene oxide, 30,000 ppm sodium tridecylbenzene sulfonate and different concentrations of thiourea, a series of solutions was prepared containing from 0 to 30,000 ppm thiourea. Each solution was divided into two parts for testing. One portion of each test solution was maintained at 120° F. whereas the other portion was maintained at about 325° F. for a period of four hours. The viscosity of each position was then measured at 120° F. and the results are tabulated below.

| Thiourea (ppm) | Run No. | Viscosity (cp)[a] at 120° F. | |
|---|---|---|---|
| | | Sample at 120° F. | Sample Heated to 325° F. |
| 0.0 | 1 | 1.5 | 0.8 |
| 5,000 | 2 | 17.0 | 12.4 |
| 10,000 | 3 | 45.4 | 122 |
| 20,000 | 4 | NM[b] | 170 |

| Thiourea (ppm) | Run No. | Viscosity (cp)$^a$ at 120° F. Sample at 120° F. | Sample Heated to 325° F. |
|---|---|---|---|
| 30,000 | 5 | 47.7 | 12.7$^c$ |

$^a$Measured on a Brookfield Model LVT viscometer, shear rate 7.3 sec$^{-1}$
$^b$NM represents "not measured"
$^c$12.7 was the viscosity of the top phase. A second phase was present at the bottom of the tube.

The results in runs 3 and 4 show that at levels of 10,000–20,000 ppm, thiourea stabilizes the viscosity of the inventive composition in a dramatic fashion even after heat treatment to 325° F.

Based on the results of the runs in the above example, it can be concluded that preferably the compositions of runs 3 and 4 of the present invention are sufficiently stable to be useful in steam foam applications in postprimary oil recovery. In the absence of protection against oxidative degradation, e.g., in run 1, it can be seen by the low viscosity value resulting after the 325° F. heat treatment that the polymer has been degraded and consequently any beneficial effect in steam foam applications which would be expected from the bulk or interfacial viscosity arising because of the presence of the polymer has been lost.

I claim:

1. An aqueous solution exhibiting a relatively stable solution viscosity at ambient temperature and after heating at 70° C. consisting essentially of, based on the total weight of the solution:
   (a) 0.001 to 2 weight percent of a nonionic polyalkylene oxide polymeric component which is a polyethylene oxide or a polypropylene oxide having an average molecular weight in the range of 100,000 to 10,000,000,
   (b) 0.5 to 10 weight percent of an ionic surfactant,
   (c) 0.1 to 9 weight percent thioruea, and
   (d) the balance water.

2. A composition according to claim 1 wherein (a) is a polyalkylene oxide having a molecular weight of 3,000,000 to 5,000,000 and (b) is a petroleum sulfonate anionic surfactant.

3. A composition according to claim 1 wherein the amount of (a) is in the range of 0.1 to 1.5 weight percent, (b) is in the range of 2 to 8 weight percent, and (c) is in the range of 3 to 6 weight percent.

4. A composition according to claim 3 wherein (a) is a polyethylene oxide and (b) is a petroleum sulfonate.

5. A method for improving the stability of the solution viscosity of an aqueous solution containing (a) from 0.001 to 2 weight percent of a nonionic polyalkylene oxide polymeric component which is a polyethylene oxide or a polypropylene oxide having an average molecular weight in the range of 100,000 to 10,000,000 and (b) from 0.5 to 10 weight percent of an ionic surfactant which comprises incorporating into said aqueous solution 0.1 to 9 weight percent of thioruea based on the total weight of aqueous solution.

6. A method according to claim 5 wherein (a) is a polyethylene oxide and (b) is a petroleum sulfonate anionic surfactant.

7. A process according to claim 5 wherein (a) is a polyethylene oxide having a molecular weight of 3,000,000 to 5,000,000 and is present in the range of 0.1 to 1.5 weight percent, (b) is a petroleum sulfonate and is present in an amount ranging from 2 to 8 weight percent and (c) is present in an amount ranging from 3 to 6 weight percent based on the total weight of the solution.

* * * * *